June 30, 1936. A. WETTSTEIN Re. 20,027

FUEL NOZZLE FOR OIL FURNACES

Original Filed Oct. 23, 1934

Inventor:
August Wettstein

By Potter, Pierce + Scheffler
Attorneys.

Reissued June 30, 1936

Re. 20,027

UNITED STATES PATENT OFFICE 20,027

FUEL NOZZLE FOR OIL FURNACES

August Wettstein, Baden, Switzerland, assignor to Aktiengesellschaft Brown, Boveri & Cie., Baden, Switzerland, a joint-stock company Original No. 2,015,611, dated September 24, 1935, Serial No. 749,595, October 23, 1934. Application for reissue March 27, 1936, Serial No. 71,343. In Germany November 4, 1933

8 Claims. (Cl. 299—150)

This invention relates to fuel burners or nozzles for oil furnaces, and particularly to fuel nozzles that may be adjusted over a wide range of load limits.

It has been the practice to employ a plurality of small nozzles or burners in the fire chamber of a furnace which is to be operated under varying loads as it has not been possible heretofore to regulate nozzles over a wide range of load, especially those nozzles which are designed to effect a mechanical atomizing of the fuel. When operating under small loads, a number of the nozzles are put out of operation but the switching in and out of new nozzles causes an abrupt variation of the fuel feed which results in poor combustion and fluctuation of the regulation. There is also the danger that the nozzles which are not in operation will be clogged by the coking of the fuel residue or will be burned or damaged by the high temperature in the fuel chamber.

An object of the present invention is to provide a fuel nozzle or burner for liquid fuel that may be adjusted over a very wide range of load limits. An object is to provide a fuel nozzle or burner which includes a plurality of adjustable nozzles of different sizes that are arranged within each other, preferably concentrically, and which may be placed in operation successively in accordance with the fuel demand. A further object is to provide a fuel nozzle or burner which includes a plurality of concentrically arranged and telescoped fuel nozzles, each nozzle including an atomizer head and a valve plunger for regulating the flow of fuel through the atomizer head, the atomizer head of each smaller nozzle forming the valve plunger of the next larger nozzle. A further object is to provide a fuel nozzle or burner including a plurality of concentrically arranged nozzles of different capacities and a single regulating member for progressively placing the several nozzles in operation, the movement of each larger nozzle into operating condition being automatically accompanied by a closing of the next smaller nozzle.

These and other objects and advantages of the invention will be apparent from the following specification when taken with the accompanying drawing in which.

Figure 2:
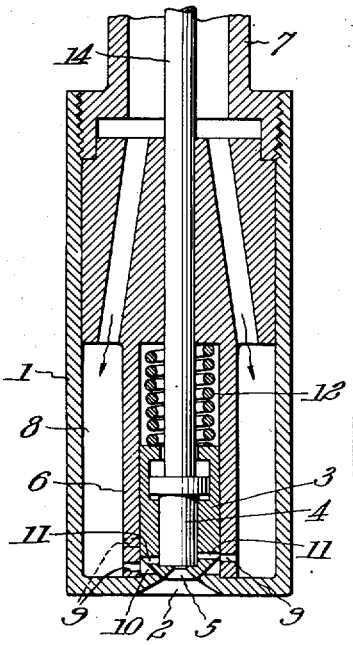
Fig. 2 is a longitudinal section showing the parts in closed position.
Figure 1:
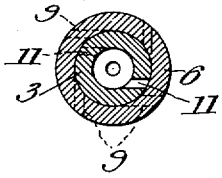
Fig. 1 is a fragmentary transverse section through one embodiment of the invention, as taken on line 1—1 of Fig. 3.

For simplicity and clearness of illustration, the several views of the drawing illustrate burners having two nozzles, but it is to be understood that the invention is not limited to this or any other number of nozzles.

In the drawing, the reference numeral 1 identifies the cylindrical shell of the multiple nozzle burner which is provided with a fuel outlet 2 that is inwardly flared from both faces of the end wall to form an atomizing orifice. The inner flared face of the opening 2 constitutes a valve seat which is engaged by the correspondingly flared tip of the valve plunger 3 which, in accordance with this invention, is designed as a fuel nozzle. The member 3 is a hollow sleeve within which the valve plunger 4 is slidably mounted, the lower face of the valve plunger 4 being flat to engage the end surface of the member 3 which is provided with a central atomizing orifice 5. The apertured end walls of the members 1 and 3 constitute nozzles for projecting a stream of atomized fuel into the combustion chamber but for convenience of description these elements will be defined in the following specification and claims as "atomizer heads". As shown in Fig. 2, the outer surface of the orifice 2 has a somewhat greater slope than the outer surface of the orifice 5 to provide clearance for the rotating stream of atomized fuel which is discharged from orifice 5 when the burner is operated under relatively light loads.

The member 3 is slidably mounted in the sleeve 6 which is mounted in the shell 1 by its inner enlarged portion that is apertured to permit the passage of fuel from the hollow burner mounting 7 into the annular space 8 at the outer end of the burner head 1. The outer end of the sleeve 6 is provided with a number of tangential passages 9 which open into the annular space 10 between the conical end of the member 3 and the end wall of the sleeve 1, and similar tangential passages 11 in the member 3 afford communication between the chamber 10 and the interior chamber of the member 3. The several passages of each set are axially spaced to provide graduated control of the fuel supply as the valve plunger of each atomizer head is progressively displaced.

The member 3 is normally retained in its outer position by the spring 12 and the initial displacement of the inner valve plunger 4 does not result in a movement of the member 3, since the collar 4' on the valve plunger 4 has a limited range of sliding movement within the member 3. The plunger 4 is actuated by and may be integral with the control member 14 of the fuel regulator, not shown, which may be and preferably is of the automatic type.

Figure 3:
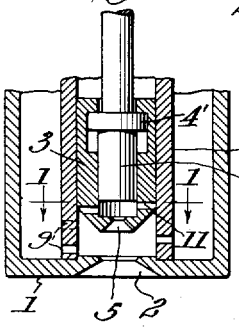
Fig. 3 is a fragmentary transverse section of the same but showing the smaller nozzle closed and the larger nozzle in partly open position.

As shown in Fig. 2, the plunger 4 is seated on the end of the member 3 and interrupts all flow of fuel to the nozzle. For relatively light loads, the plunger 4 will be displaced to uncover one or more of the fuel passages 11 to regulate the flow of fuel through the orifice 5 of the inner atomizer head. It is well known that the maximum amount of fuel which may be discharged through a nozzle of this type is limited by relatively strict design requirements which have resulted in the present practice of employing a plurality of separate nozzles when the fuel demand exceeded the maximum output of a single small nozzle. In the present construction, the continued inward movement of valve plunger 3 after the last passage 11 has been cleared brings the collar 4' into engagement with the inturned flange of the member 3 and results in an inward movement of the member 3. When this takes place, fuel is discharged directly from the chamber 10 through the orifice 2 of the outer atomizing head. At the same time, the member 3 is forced inwardly by the fluid pressure within the chamber 10, since that pressure now acts upon that portion of the conical end of member 3 which was previously seated upon the flared inner surface of the orifice 2 (see Fig. 3). The passages 9 are so proportioned that the flow of fuel through the outer atomizer head at the instant of the opening of its valve plunger is substantially equal to the maximum flow of fuel through the inner atomizing head. For heavier loads, the fuel supply through the outer atomizing head is increased by the progressive movement of the member 3 to uncover additional passages 9.

It will be apparent that the same principles may be embodied in a burner which includes more than two atomizer heads but, in general, two atomizer heads will afford a sufficient range of control. If the inner head is given such dimensions, for example, that it has a maximum output equal to one-fourth the maximum output of the outer head, and if the greatest amount of fuel that can be handled with efficient atomizing by each head is equal to about four times the smallest amount, the range of regulation of the double atomizing head is therefore one to sixteen. As both heads are constantly bathed in fuel which flows around them on all sides, undesired heating and clogging are avoided.

For smooth operation, the change from one nozzle or atomizer head to another should be made as quickly as possible and the nozzle which comes into operation should deliver substantially the same quantity of fuel as the nozzle which goes out of operation. This second requirement may be satisfied by an appropriate design of the fuel passages 9, 11, and the pressure of the fuel may be employed to effect a quick change over from one nozzle to another.

Figure 4:
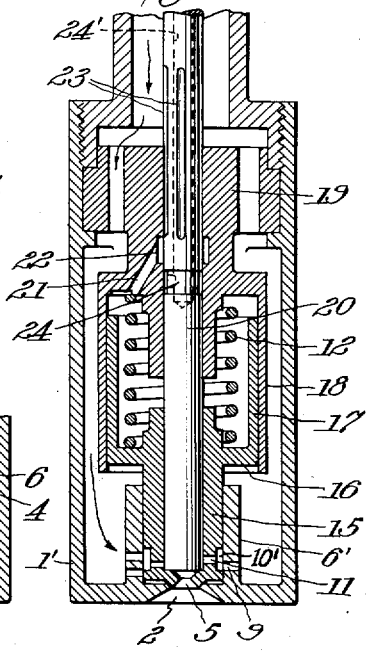
Figs. 4, 5 and 6 are fragmentary longitudinal sections illustrating typical embodiments of the invention.

In the embodiment of the invention which is shown in Fig. 4, the outer shell 1' is provided with an integral sleeve 6' within which the hollow plunger 15 is slidably mounted, the lower end of the sleeve having a set of tangential fuel passages 9 which open into the annular chamber 10' that is formed by circumferentially grooving the plunger 15. A set of tangential fuel passages 11 extend through the wall of the plunger 15 and, as in the previously described form of the invention, the shell 1' and plunger 15 have atomizing orifices 2, 5, respectively. The inner end of valve plunger 15 is provided with a piston 16 and cylinder 17 which is telescoped within the cylindrical extension 18 of a guide member 19. The guide member has lateral ports for passing fuel to the lower chamber 8 and a central bore in which the control rod 20 is slidably mounted, the lower end of the rod serving as the valve plunger of the inner atomizer head. The outer plunger member 15 is normally retained in outermost position by a spring 12 and by pressure of the fluid fuel which is admitted to the interior of the telescoped cylinders through the port 21 and ring chamber 22 in guide member 19, and the longitudinal grooves 23 of the control rod 20. The lower ends of grooves 23 terminate at such a level as to interrupt the communication of the fuel supply with the ring chamber 22 when the rod 20 is displaced to establish maximum flow through the inner atomizing head and, simultaneously, the pressure within the telescoped cylinders is relieved as the reduced diameter section 24 of the rod 20 moves into alinement with ring chamber 21, the pressure chamber exhausting through the bore 24' of rod 20 to a space of lower pressure than the incoming fuel, for example to the main fuel tank. As the fuel is supplied to the burner under high pressure, the excess pressure on the outer face of piston 16 forces the member 15 inwardly rapidly, thus cutting off flow of the inner atomizer head and opening one or more of the fuel passages 9 to deliver approximately the same quantity of fuel through the outer atomizer head as was previously discharged through the inner atomizer head.

Figure 5:
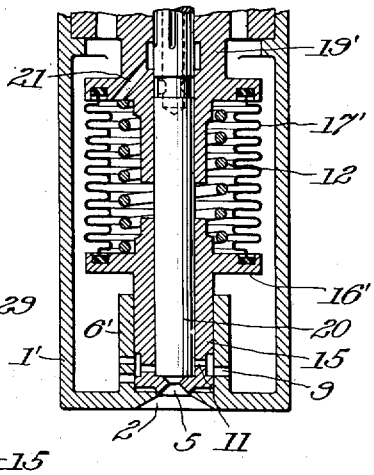

In place of the telescoped cylinders 17, 18, the pressure chamber may be formed by a sylphon bellows 17' which extends from the inner face of piston 16', Fig. 5, to the guide member 19'. The other parts of this embodiment of the invention may be substantially identical with corresponding parts of the Fig. 4 embodiment, and are therefore identified by like reference numerals but will not be described in detail.

Figure 6:
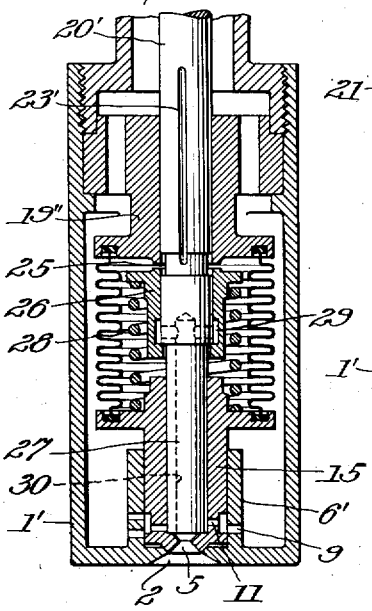

The form of the invention shown in Fig. 6 provides a more convenient method of disposing of the excess fuel within the pressure chamber when the outer atomizer head is placed in operation. The pressure chamber is constructed substantially as in the Fig. 5 embodiment but the channels 23' in control rod 20' extend directly into the pressure chamber. The lower face of the guide member 19'' is provided with an annular valve seat 25 for cooperation with the sleeve valve 26 that is slidably mounted on the control rod 20'. The valve plunger end 27 of the rod 20' is of reduced diameter and the outer end of the sleeve valve 26 is inturned and normally held against the radial shoulder on rod 20' by the spring 28. The valve sleeve 26 has an internal ring chamber 29 that opens into the counterbore 30 in the valve plunger 27, but this ring chamber is normally sealed against the pressure fluid by the engagement of the flanged end of the sleeve valve with the radial shoulder on rod 20'.

When the valve plunger 27 has fully opened the fuel passages to the inner atomizer head, a further movement of the control rod 20' brings the valve sleeve 26 into engagement with the valve seat 25 and thus seals off the pressure chamber. Further movement of the control rod opens the ring chamber of the sleeve valve to the pressure chamber, thus placing the pressure chamber in communication with the fire chamber through the bore 30. The high pressure of the fuel in chamber 8 causes a quick collapse of the sylphon bellows, closing the inner nozzle or atomizer head and opening the fuel passages to the outer atomizer head.

It will be apparent that the invention is not limited to the particular constructions herein illustrated and described, as the exact number of nozzles included in the burner may be varied to meet different requirements and the mechanism for shifting from one nozzle to another is subject to considerable variation.

I claim:

1. A burner comprising a plurality of telescoped nozzles, each nozzle including an apertured sleeve terminating in an atomized head and a valve plunger adjustable within the sleeve to control the delivery of fuel through the apertures thereof, the sleever and atomizer head of an inner nozzle constituting the valve plunger of an adjacent outer nozzle, the apertures in said sleeves comprising a plurality of tangential fuel passages axially spaced apart along said sleeves whereby said fuel passages may be progressively opened by axial displacement of said valve plungers.

2. A burner as claimed in claim 1, in combination with means operable upon a displacement into fully open position of the valve plunger of the inner nozzle to close the apertured sleeve of the inner nozzle upon that plunger, thereby placing the outer nozzle in operation.

3. A multiple nozzle burner comprising an outer nozzle including a sleeve terminating in an atomizer head, axially spaced fuel passages extending through said sleeve, a valve plunger slidable in said sleeve to control the flow of fuel through said passages, said valve plunger being an apertured sleeve terminating in an inner atomizer head, a control member slidable in said valve plunger to control the flow of fuel through the inner atomizer head, means normally retaining said valve plunger in position to prevent fuel flow through the outer atomizer head, and means operable when said control member has fully opened the inner atomizer head to render said retaining means inoperative and to move said valve plunger to close said inner atomizer head, thereby opening said outer atomizer head.

4. A burner as claimed in 3, wherein said retaining means comprises means defining a pressure chamber for holding said valve plunger in position to prevent fuel flow to the outer atomizer head, inlet and outlet passage means for said pressure chamber, and means on said control member for controlling the flow of a pressure fluid through said passage means.

5. A multiple nozzle burner comprising a hollow burner head and means for introducing fluid fuel into said head, an atomizing orifice at the end of said burner head, a sleeve within said head and provided with a plurality of tangential and axially spaced passages through the wall thereof, a plunger slidable within said sleeve to control fuel flow through said passages, said plunger cooperating with said sleeve and orifice to form an outer nozzle, said plunger being hollow and terminating in an atomizing orifice constituting an inner atomizer head telescoped within said outer nozzle, tangential and axially spaced fuel passages in the wall of said plunger, a control member slidable within said plunger to control fuel flow to the inner atomizer head, a piston on said plunger and means cooperating therewith to form a pressure chamber for retaining said plunger in position to close said outer nozzle, inlet passage means affording communication between said pressure chamber and the fuel space within said burner head, a relief passage for said pressure chamber, and means operable upon a predetermined displacement of said control member with respect to said plunger to close said inlet passage means and open said relief passage, whereby said pressure chamber is collapsed and said plunger moved thereby to admit fuel to the outer nozzle.

6. A burner as claimed in claim 5, wherein said means cooperating with the piston to define a pressure chamber is a cylinder fixed to the piston and telescoped within a cylinder fixed to said burner head.

7. A burner as claimed in claim 5, wherein said means cooperating with the piston to define a pressure chamber is a sylphon bellows having one end closed by said piston and its opposite end fixed to said burner head.

8. A burner as claimed in claim 5, wherein said means cooperating with said piston to form a pressure chamber includes a guide member in which said control member is slidably mounted, said inlet passage means comprises a longitudinal channel in said control member, and the means to close said inlet passage means comprises a valve seat on said guide member and a sleeve valve mounted on said control member.

AUGUST WETTSTEIN.